US009654490B2

United States Patent
Kim et al.

(10) Patent No.: US 9,654,490 B2
(45) Date of Patent: May 16, 2017

(54) SYSTEM AND METHOD FOR FUZZING NETWORK APPLICATION PROGRAM

(71) Applicant: ELECTRONICS AND TELECOMMUNICATIONS RESEARCH INSTITUTE, Daejeon (KR)

(72) Inventors: Dong Geun Kim, Daejeon (KR); Byung Jun Lim, Daejeon (KR); Jong-Myoung Kim, Daejeon (KR); Jaeseo Lee, Daejeon (KR); Su Yong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 420 days.

(21) Appl. No.: 14/561,730

(22) Filed: Dec. 5, 2014

(65) Prior Publication Data

US 2015/0350235 A1 Dec. 3, 2015

(30) Foreign Application Priority Data

May 30, 2014 (KR) .......................... 10-2014-0065519

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *G06F 2221/033* (2013.01)

(58) Field of Classification Search
CPC ............... H04L 63/1433; G06F 21/577; G06F 2221/033
See application file for complete search history.

(56) References Cited

U.S. PATENT DOCUMENTS

| 7,594,142 B1 * | 9/2009 | O'Leary | G06F 21/577 |
| | | | 714/38.11 |
| 2003/0130813 A1 * | 7/2003 | Adir | G06F 11/263 |
| | | | 702/119 |

(Continued)

FOREIGN PATENT DOCUMENTS

| KR | 10-2008-0043209 A | 5/2008 |
| KR | 10-2009-0054532 A | 6/2009 |
| KR | 10-2009-0080741 A | 7/2009 |

*Primary Examiner* — Darren B Schwartz
(74) *Attorney, Agent, or Firm* — LRK Patent Law Firm

(57) ABSTRACT

A system and method for fuzzing a network application program, which use a captured packet upon fuzzing a network application program, and thus neither a protocol analysis procedure nor the production of a fuzzer program is required. The system for fuzzing a network application program includes a fuzzing performance client program unit for generating a packet to be transmitted from a captured packet, applying a fuzzing rule to the packet to be transmitted, and outputting a resulting packet. A fuzzing supervisor program unit provides the packet from the fuzzing performance client program unit to a target program to be fuzzed, monitors an event and abnormal termination of the target program to be fuzzed, and analyzes a situation of termination to verify security vulnerabilities if abnormal termination has occurred.

14 Claims, 5 Drawing Sheets

(56) References Cited

U.S. PATENT DOCUMENTS

| | | | | |
|---|---|---|---|---|
| 2003/0196191 | A1* | 10/2003 | Hartman | G06F 11/3684 717/126 |
| 2004/0210874 | A1* | 10/2004 | Kageyama | G06F 11/3684 717/124 |
| 2007/0203973 | A1* | 8/2007 | Landauer | H04L 12/2697 709/203 |
| 2008/0256340 | A1* | 10/2008 | Conger | G06F 21/577 712/217 |
| 2008/0263671 | A1* | 10/2008 | Solino Testa | G06F 21/577 726/25 |
| 2008/0288822 | A1* | 11/2008 | Wu | G06F 21/577 714/32 |
| 2008/0301647 | A1* | 12/2008 | Neystadt | G06F 11/3672 717/127 |
| 2008/0301813 | A1* | 12/2008 | Neystadt | G06F 11/3672 726/25 |
| 2008/0320328 | A1* | 12/2008 | O'Leary | G06F 21/57 714/25 |
| 2009/0164478 | A1* | 6/2009 | Natanov | G06F 11/3684 |
| 2009/0164975 | A1* | 6/2009 | Natanov | G06F 11/3684 717/127 |
| 2009/0187989 | A1 | 7/2009 | Kim et al. | |
| 2009/0228871 | A1* | 9/2009 | Edwards | G06F 21/577 717/128 |
| 2011/0314454 | A1* | 12/2011 | Godefroid | G06F 11/3676 717/131 |
| 2013/0212435 | A1* | 8/2013 | Qiu | G06F 11/368 714/32 |
| 2013/0340083 | A1* | 12/2013 | Petrica | G06F 11/263 726/25 |

* cited by examiner

SYSTEM AND METHOD FOR FUZZING NETWORK APPLICATION PROGRAM

CROSS REFERENCE TO RELATED APPLICATION

This application claims the benefit of Korean Patent Application No. 10-2014-0065519, filed May 30, 2014, which is hereby incorporated by reference in its entirety into this application.

BACKGROUND OF THE INVENTION

1. Technical Field

The present invention relates generally to a system and method for fuzzing a network application program and, more particularly, to a system and method that perform fuzzing by injecting a random value into a packet during the transmission of the packet using a captured packet upon conducting a fuzz testing on a network application program.

2. Description of the Related Art

Fuzzing denotes a technique for searching for security vulnerabilities in software by repeatedly inputting random data to software and by causing systematic failures in software.

A fuzzing technique is based on fault injection that transmits various input values to an analysis target system so as to detect security vulnerabilities.

The principal advantages of such a fuzzing technique are that, in a procedure for detecting security vulnerabilities, simplicity, efficiency, automation, and speed may be improved, and the fuzzing technique is usefully used to test a plurality of applications.

Such a conventional technology requires the analysis of protocols for packets that are exchanged between a client and a server upon fuzzing a network application program, and needs the production of a separate program depending on the analysis of protocols. Since this is a procedure requiring a lot of manpower and time, the manpower and time are regarded as costs required for fuzzing. Further, in a situation in which detailed analysis forms for the protocols of network application programs that are targets to be fuzzed are not present, the analysis of protocols and the production of programs require much higher costs.

As related preceding technology, Korean Patent Application Publication No. 10-2008-0043209 is disclosed. In this technology, a socket Application Programming Interface (API) hooking function is inserted into a network program running on a Microsoft (MS) Windows operating system via Dynamic Linked Library injection (hereinafter referred to as "DLL injection"), so that a network program intercepts a packet, transmitted or received to or from a counterpart network program using a socket API function, fabricates the corresponding packet or deforms the packet into an abnormal packet by adding various fuzzing data sets to the data of the packet, and transmits the abnormal packet, thus performing network fuzzing on unknown protocols as well as universal protocols.

SUMMARY OF THE INVENTION

Accordingly, the present invention has been made keeping in mind the above problems occurring in the prior art, and an object of the present invention is to provide a system and method for fuzzing a network application program, which use a captured packet upon fuzzing a network application program, and thus neither a protocol analysis procedure nor the production of a fuzzer program is required.

In accordance with an aspect of the present invention to accomplish the above object, there is provided a system for fuzzing a network application program, including a fuzzing performance client program unit for generating a packet to be transmitted from a captured packet, applying a fuzzing rule to the packet to be transmitted, and outputting a resulting packet; and a fuzzing supervisor program unit for providing the packet from the fuzzing performance client program unit to a target program to be fuzzed, monitoring an event and abnormal termination of the target program to be fuzzed, and analyzing a situation of termination to verify security vulnerabilities if abnormal termination has occurred.

The fuzzing performance client program unit may include a captured packet database (DB) for storing packets captured from content communicated by the target program to be fuzzed; a packet generation unit for loading the captured packet stored in the captured packet DB, and generating the packet to be transmitted; a fuzzing rule DB for storing fuzzing rules required to apply malformation for fuzzing to the packet generated by the packet generation unit; and a fuzzing rule application unit for applying a corresponding fuzzing rule stored in the fuzzing rule DB to the packet generated by the packet generation unit, and outputting a resulting packet.

The fuzzing rules stored in the fuzzing rule DB may include rule application conditions required to determine whether to apply a rule to malformation of data for fuzzing, and application rules enabling any data to be inserted into a specific field of the generated packet or to be deleted from the specific field, or enabling data in the specific field to be malformed, for individual fields of a network protocol.

Each of the rule application conditions may include one or more of a packet sequence and a packet data pattern.

The fuzzing rule application unit may be configured to apply or not apply the fuzzing rule to the packet generated by the packet generation unit depending on whether an application condition to be applied to the packet is present in the fuzzing rule DB.

The fuzzing rule application unit may be configured to, if the fuzzing rule is applied, malform and output single-bit or multi-bit data of the packet generated by the packet generation unit before the corresponding packet is output.

The fuzzing rule application unit may be configured to, if the fuzzing rule is not applied, output the packet generated by the packet generation unit without modifying the packet.

The fuzzing supervisor program unit may include a state monitoring unit for monitoring an event and abnormal termination of the target program to be fuzzed; an event recording unit for recording the event monitored by the state monitoring unit; and an analysis unit for, as the state monitoring unit detects occurrence of abnormal termination of the target program to be fuzzed, analyzing a situation of abnormal termination to verify security vulnerabilities.

The fuzzing performance client program unit may initiate fuzzing after the target program to be fuzzed has been executed.

The fuzzing performance client program unit may be installed on a client computer.

The fuzzing supervisor program unit may be installed on a server computer and is operated in a form of a local proxy.

In accordance with another aspect of the present invention to accomplish the above object, there is provided a method for fuzzing a network application program, including generating, by a fuzzing performance client program unit, a packet to be transmitted from a captured packet; applying, by a fuzzing performance client program unit, a fuzzing rule to the packet to be transmitted and outputting, by the fuzzing performance client program unit, a resulting packet; providing, by a fuzzing supervisor program unit, the packet output from the fuzzing performance client program unit to a target program to be fuzzed, and monitoring, by the fuzzing supervisor program unit, an event and abnormal termination of the target program to be fuzzed; and analyzing, by the fuzzing supervisor program unit, a situation of termination to verify security vulnerabilities if abnormal termination of the target program to be fuzzed has been detected.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
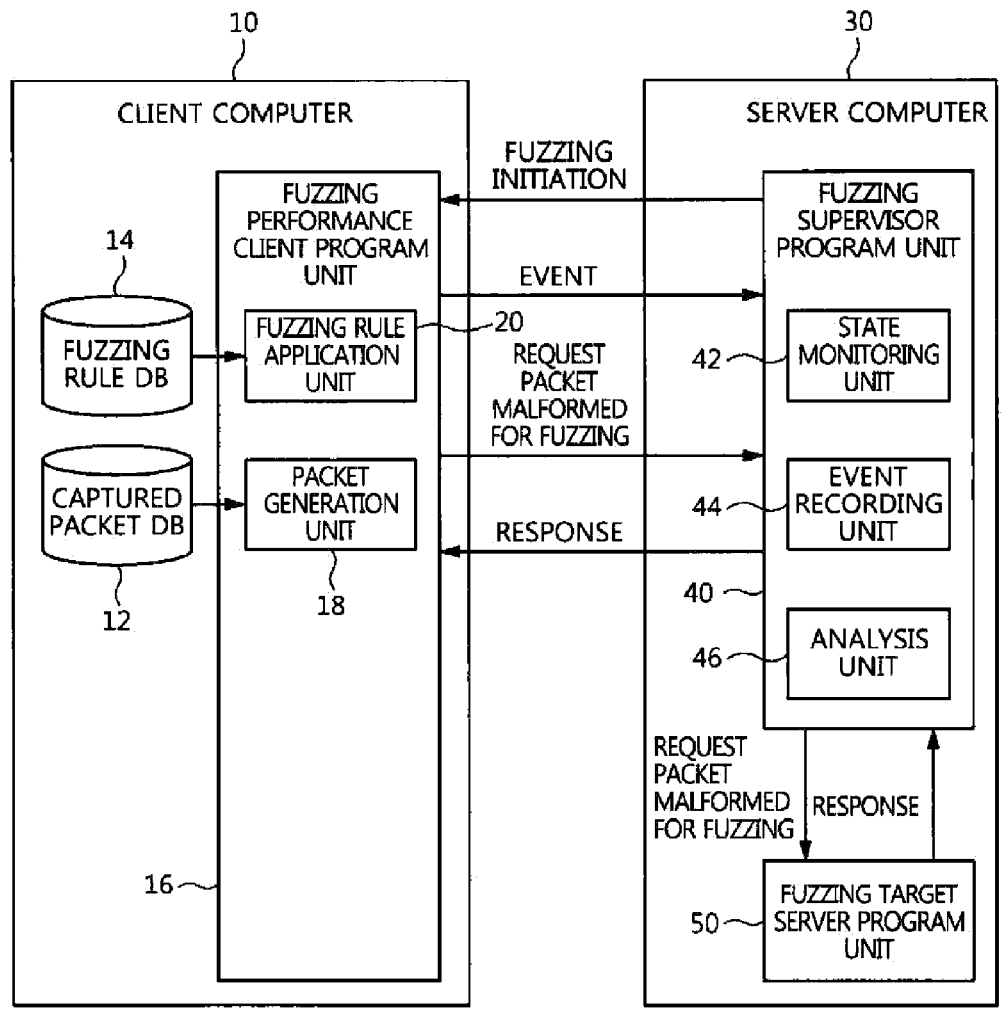
FIG. 1 is a configuration diagram showing a system for fuzzing a network application program according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a configuration diagram showing a system for fuzzing a network application program according to an embodiment of the present invention.

The system for fuzzing a network application program according to the embodiment of the present invention includes a fuzzing performance client program unit 16, a fuzzing supervisor program unit 40, and a fuzzing target server program unit 50.

In FIG. 1, a captured packet database (DB) 12 captures and stores packets from content communicated by the fuzzing target server program unit 50 before the fuzzing method of the present invention is performed. That is, the captured packet DB 12 stores the captured packets and has a format in which each packet occurring in transmission/reception over a network is captured using a tool, such as tcpdump or Wireshark which is developed using, for example, a packet capture (pcap) library, and is stored as a file.

The fuzzing rule DB 14 stores fuzzing rule data sets required to apply malformation for fuzzing to each packet loaded and generated from the captured packet DB 12.

The fuzzing performance client program unit 16 is installed on the client computer 10 and both the fuzzing supervisor program unit 40 and the fuzzing target server program unit 50 are installed on a server computer 30.

The fuzzing performance client program unit 16 loads a captured packet from the captured packet DB 12, generates data of a packet to be transmitted, applies or does not apply a fuzzing rule to the generated packet depending on whether an application condition, which will be applied to the packet data to be transmitted, is present in the fuzzing rule DB 14, and transmits the packet to the fuzzing supervisor program unit 40. If a rule application condition is not applied when the captured packet is transmitted through the fuzzing performance client program unit 16, the generated packet is transmitted with the stored content of the packet maintained, without the packet data thereof being modified.

Accordingly, the fuzzing performance client program unit 16 may be regarded as including a packet generation unit 18 and a fuzzing rule application unit 20. The packet generation unit 18 loads a captured packet from the captured packet DB 12, and generates packet data to be transmitted. The fuzzing rule application unit 20 applies or does not apply a fuzzing rule to the packet data generated by the packet generation unit 18 depending on whether an application condition is present in the fuzzing rule DB 14. Here, when the fuzzing rule is applied, the fuzzing rule application unit 20 malforms single-bit data or multi-bit data of the packet generated by the packet generation unit 18 and outputs the malformed data before the corresponding packet is transmitted.

The fuzzing supervisor program unit 40 is operated in the form of a local proxy on the server computer 30, and is configured to exchange packets with the fuzzing target server program unit 50 and monitor an event in and abnormal termination occurring in the fuzzing target server program unit 50.

Accordingly, the fuzzing supervisor program unit 40 may be regarded as including a state monitoring unit 42, an event recording unit 44, and an analysis unit 46. The state monitoring unit 42 exchanges packets with the fuzzing target server program unit 50, and monitors an event and abnormal termination occurring in the fuzzing target server program unit 50. The event recording unit 44 records the event monitored by the state monitoring unit 42. As the state monitoring unit 42 detects the abnormal termination of a program occurring in the fuzzing target server program unit 50, the analysis unit 46 analyzes the situation of termination (that is, a situation in which the program is abnormally terminated) so as to verify security vulnerabilities.

The fuzzing target server program unit 50 is equipped with a fuzzing target server program that may be regarded as a target program to be analyzed. The fuzzing target server program unit 50 executes the fuzzing target server program in compliance with a fuzzing initiation command output from the fuzzing supervisor program unit 40.

In the case of the configuration shown in FIG. 1, the fuzzing performance client program unit 16 is initially executed on the client computer 10, and the fuzzing supervisor program unit 40 is executed on the server computer 30.

The fuzzing target server program unit 50 is executed by the fuzzing supervisor program unit 40 on the server computer 30.

In FIG. 1, the performance of fuzzing is initiated by the fuzzing supervisor program unit 40 and the fuzzing target server program unit 50 is executed, and thereafter the fuzzing initiation command is transferred to the fuzzing performance client program unit 16.

Accordingly, the packet generation unit 18 of the fuzzing performance client program unit 16 loads a captured packet from the captured packet DB 12 and, generates a packet, and the fuzzing rule application unit 20 searches the fuzzing rule DB 14 for a fuzzing rule corresponding to the generated packet, finds the fuzzing rule, applies the fuzzing rule to the corresponding packet, and generates from the packet a request packet malformed for fuzzing.

Thereafter, the fuzzing performance client program unit 16 transmits the request packet malformed for fuzzing to the fuzzing supervisor program unit 40.

Therefore, the fuzzing supervisor program unit 40 transfers the request packet malformed for fuzzing to the fuzzing target server program unit 50, receives a response from the fuzzing target server program unit 50, and then forwards the response to the fuzzing performance client program unit 16.

Figure 2:
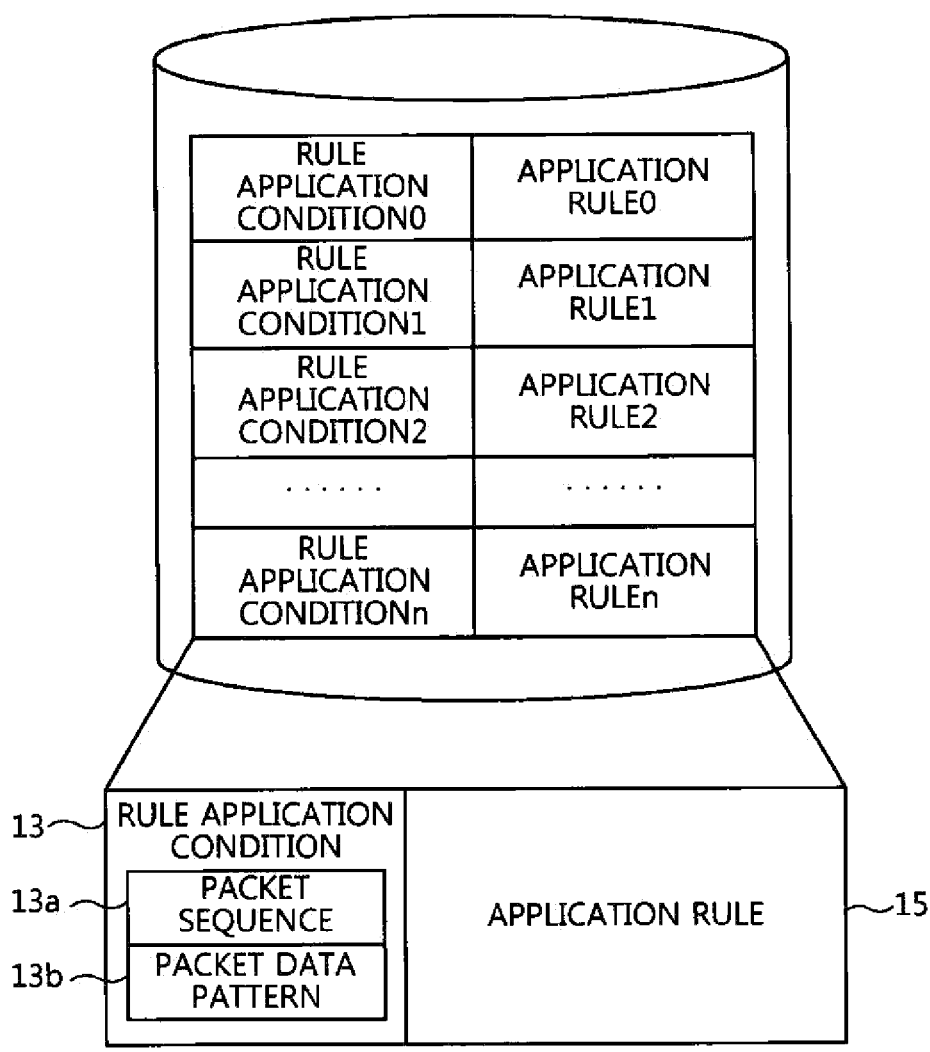
FIG. 2 is a configuration diagram showing a fuzzing rule database (DB) shown in FIG. 1.

FIG. 2 is a configuration diagram showing the fuzzing rule DB 14 shown in FIG. 1.

The fuzzing rule DB 14 stores fuzzing rules, which include rule application conditions 13 and application rules 15.

Each of the rule application conditions 13 includes a packet sequence 13*a* or a packet data pattern 13*b*. The rule application condition 13 specifies conditions corresponding to one or more of the packet sequence 13*a* and the packet data pattern 13*b*, and determines whether to apply the corresponding rule to the malformation of data for fuzzing.

The application rules 15 enable any data to be inserted into a specific field of packet data or to be deleted from the specific field, or enable the data in the specific field to be malformed, for individual fields of a network protocol.

Figure 3:
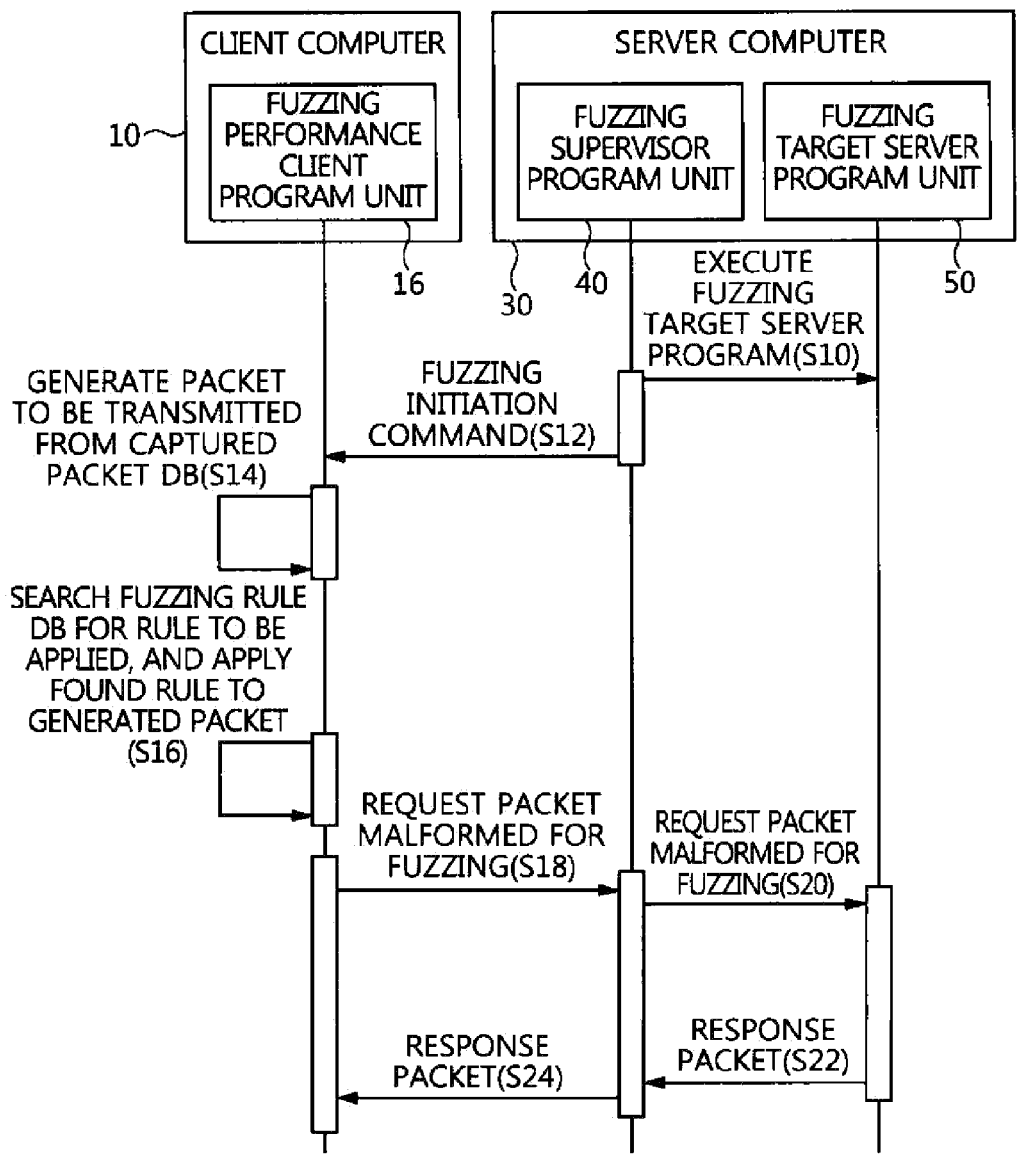
FIG. 3 is a control flow diagram showing the system for fuzzing a network application program according to an embodiment of the present invention.

FIG. 3 is a control flow diagram showing the system for fuzzing a network application program according to an embodiment of the present invention.

First, before fuzzing is performed, the fuzzing performance client program unit 16 is installed and executed on the client computer 10, and the fuzzing supervisor program unit 40 is installed on the server computer 30 and executed in the form of a local proxy.

A performance sequence in a fuzzing performance procedure will be described below.

At step S10, the fuzzing supervisor program unit 40 in the server computer 30 executes the fuzzing target server program unit 50.

At step S12, the fuzzing supervisor program unit 40 transfers a fuzzing initiation command to the fuzzing performance client program unit 16 currently running on the client computer 10. In this case, the request packet is prevented from being lost by causing the execution of the fuzzing target server program unit 50 to precede the initiation of fuzzing performed by the fuzzing performance client program unit 16.

At step S14, the fuzzing performance client program unit 16 that received the fuzzing initiation command loads a captured packet from the captured packet DB 12, and the packet generation unit 18 generates a packet to be transmitted.

At step S16, the fuzzing performance client program unit 16 generates a request packet malformed for fuzzing by searching the fuzzing rule DB 14 for a rule to be applied and by applying the found rule to the generated packet.

At step S18, the fuzzing performance client program unit 16 transfers the request packet malformed for fuzzing to the fuzzing supervisor program unit 40 of the server computer 30.

At step S20, the fuzzing supervisor program unit 40 forwards the request packet malformed for fuzzing to the fuzzing target server program unit 50.

At step S22, the fuzzing target server program unit 50 transfers a response packet to the request packet malformed for fuzzing to the fuzzing supervisor program unit 40.

At step S24, the fuzzing supervisor program unit 40 forwards the received response packet to the fuzzing performance client program unit 16.

Figure 4:
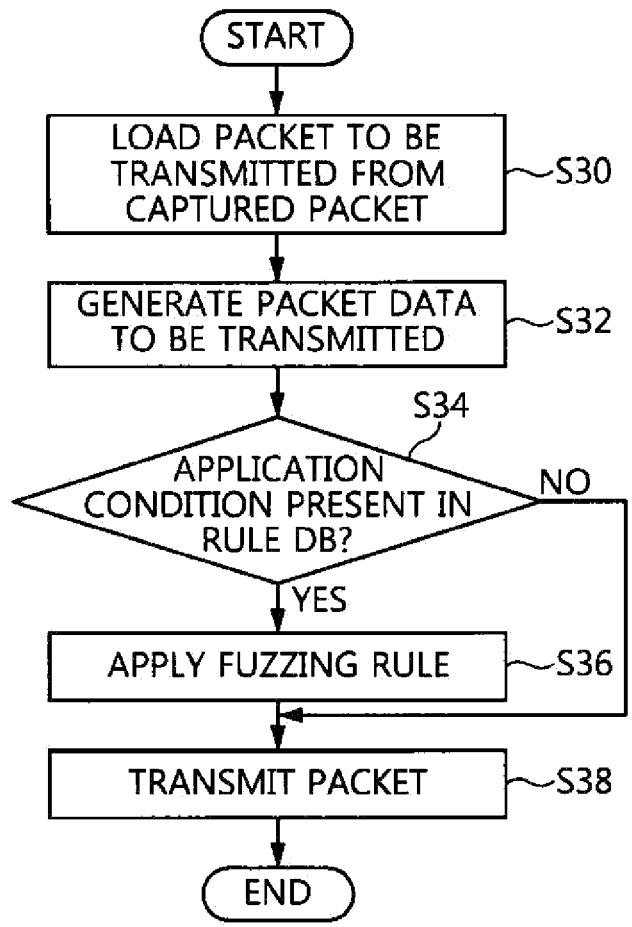
FIG. 4 is an operation flowchart showing a fuzzing performance client program unit shown in FIG. 1.

FIG. 4 is a flowchart showing the detailed operation of the fuzzing performance client program unit 16 shown in FIG. 1.

The fuzzing performance client program unit 16 loads a packet to be transmitted from captured packets, generates a request packet malformed for fuzzing by applying the fuzzing rule stored in the fuzzing rule DB 14 to the packet, and transfers the request packet to the fuzzing supervisor program unit 40 of the server computer 30.

The operation of the fuzzing performance client program unit 16 will be described in detail below.

At step S30, the fuzzing performance client program unit 16 loads a packet to be transmitted from the captured packet DB 12.

At step S32, the fuzzing performance client program unit 16 generates data of a packet to be transmitted via the packet generation unit 18.

Then, at step S34, the fuzzing performance client program unit 16 determines, via a search, whether a fuzzing rule to be applied is present in the fuzzing rule DB, by means of the packet sequence in the content of the generated packet data and pattern matching based on the packet content.

At step S36, if it is determined that the fuzzing rule to be applied is present, the fuzzing performance client program unit 16 applies the fuzzing rule to the packet via the fuzzing rule application unit 20. A type of packet in which the fuzzing rule is applied to the packet may be regarded as the request packet malformed for fuzzing.

Next, at step S38, the fuzzing performance client program unit 16 transmits the request packet malformed for fuzzing to the fuzzing supervisor program unit 40 of the server computer 30.

If the rule application condition is not applied when the captured packet is transmitted through the fuzzing performance client program unit 16 ("No" at step S34), the packet is transmitted with the stored content of the packet maintained, without the packet data being modified.

Figure 5:
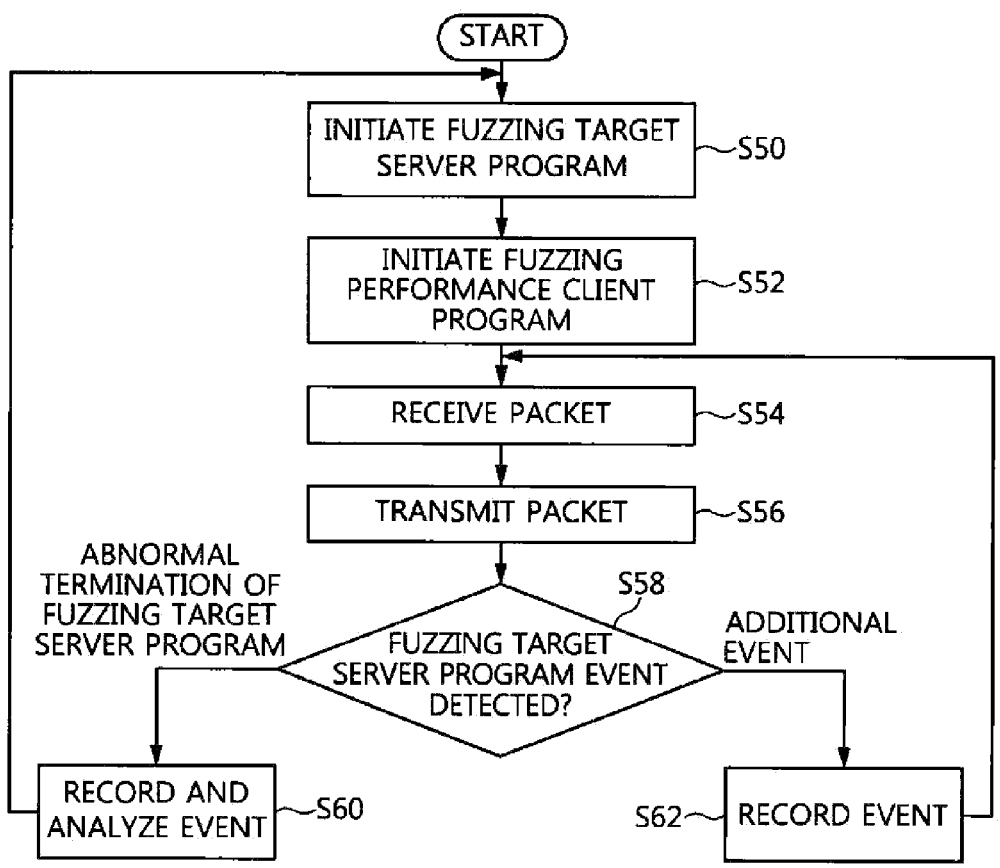
FIG. 5 is an operation flowchart showing a fuzzing supervisor program unit shown in FIG. 1.

FIG. 5 is a flowchart showing the detailed operation of the fuzzing supervisor program unit 40 shown in FIG. 1.

First, at step S50, the fuzzing supervisor program unit 40 executes the fuzzing target server program unit 50. By this operation, the fuzzing target server program unit 50 initiates a fuzzing target server program.

At step S52, the fuzzing supervisor program unit 40 transfers a fuzzing initiation command to the fuzzing performance client program unit 16 at the request of a network. Accordingly, the fuzzing performance client program unit 16 initiates a fuzzing performance client program.

At step S54, the fuzzing supervisor program unit 40 receives a packet (that is, a request packet malformed for fuzzing) from the fuzzing performance client program unit 16.

At step S56, the fuzzing supervisor program unit 40 transmits the packet (that is, the request packet malformed for fuzzing) received from the fuzzing performance client program unit 16 to the fuzzing target server program unit 50.

Accordingly, at step S58, an event for a fuzzing target server program that is running in the fuzzing target server program unit 50 is monitored.

As a result of the monitoring at step S58, if the abnormal termination of the fuzzing target server program has been detected, the event is recorded and analyzed at step S60, and the process returns to step S50.

Meanwhile, as a result of the monitoring at step S58, if an additional event other than the event for abnormal termination has occurred, the corresponding event is recorded at step S62, and the process returns to step S54.

In accordance with the present invention, an existing packet that was exchanged between a client and a server in the past is used, and thus a protocol analysis procedure may be omitted. A fuzzing performance client program for applying a fuzzing rule to a packet depending on the rules in a fuzzing rule DB and for performing fuzzing is used, and thus a separate procedure for producing a fuzzing performance program may be omitted.

In other words, the present invention is advantageous in that, upon fuzzing a network application program, a method of applying a fuzzing rule to a captured packet and transmitting a resulting packet is used, so that fuzzing is possible in a situation in which a fuzzing target server program and a captured packet are present, and conventional protocol analysis and the production of a separate program are not required, thus improving the efficiency of manpower and time upon performing fuzzing.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A system for fuzzing a network application program, comprising:
    a fuzzing performance client program generator for generating a packet to be transmitted from a captured packet, applying a fuzzing rule to the packet to be transmitted, and outputting a resulting packet; and
    a fuzzing supervisor program provider for providing the packet from the fuzzing performance client program generator to a target program to be fuzzed, monitoring an event and abnormal termination of the target program to be fuzzed, and analyzing a situation of termination to verify security vulnerabilities if abnormal termination has occurred,
    wherein the fuzzing performance client program generator comprises:
        a captured packet database (DB) for storing packets captured from content communicated by the target program to be fuzzed;
        a packet generator for loading the captured packet stored in the captured packet DB, and generating the packet to be transmitted;
        a fuzzing rule DB for storing fuzzing rules required to apply malformation for fuzzing to the packet generated by the packet generator; and
        a fuzzing rule applier for applying a corresponding fuzzing rule stored in the fuzzing rule DB to the packet generated by the packet generator, and outputting a resulting packet,
    wherein the fuzzing supervisor program provider is installed on a server computer and operated in a form of a local proxy, and
    wherein the fuzzing performance client program generator is installed on a client computer.

2. The system of claim 1, wherein the fuzzing rules stored in the fuzzing rule DB include rule application conditions required to determine whether to apply a rule to malformation of data for fuzzing, and application rules enabling any data to be inserted into a specific field of the generated packet or to be deleted from the specific field, or enabling data in the specific field to be malformed, for individual fields of a network protocol.

3. The system of claim 2, wherein each of the rule application conditions includes one or more of a packet sequence and a packet data pattern.

4. The system of claim 1, wherein the fuzzing rule applier is configured to apply or not apply the fuzzing rule to the packet generated by the packet generator depending on whether an application condition to be applied to the packet is present in the fuzzing rule DB.

5. The system of claim 4, wherein the fuzzing rule applier is configured to, if the fuzzing rule is applied, malform and output single-bit or multi-bit data of the packet generated by the packet generator before the corresponding packet is output.

6. The system of claim 4, wherein the fuzzing rule applier is configured to, if the fuzzing rule is not applied, output the packet generated by the packet generator without modifying the packet.

7. The system of claim 1, wherein the fuzzing supervisor program provider comprises:
    a state monitor for monitoring an event and abnormal termination of the target program to be fuzzed;
    an event recorder for recording the event monitored by the state monitor; and
    an analyzer for, as the state monitor detects occurrence of abnormal termination of the target program to be fuzzed, analyzing a situation of abnormal termination to verify security vulnerabilities.

8. The system of claim 1, wherein the fuzzing performance client program generator initiates fuzzing after the target program to be fuzzed has been executed.

9. A method for fuzzing a network application program, comprising:

generating, by a fuzzing performance client program generator, a packet to be transmitted from a captured packet;

applying, by a fuzzing performance client program generator, a fuzzing rule to the packet to be transmitted and outputting, by the fuzzing performance client program generator, a resulting packet;

providing, by a fuzzing supervisor program provider, the packet output from the fuzzing performance client program generator to a target program to be fuzzed, and monitoring, by the fuzzing supervisor program provider, an event and abnormal termination of the target program to be fuzzed; and analyzing, by the fuzzing supervisor program provider, a situation of termination to verify security vulnerabilities if abnormal termination of the target program to be fuzzed has been detected;

wherein the fuzzing performance client program generator comprises:

a captured packet database (DB) for storing packets captured from content communicated by the target program to be fuzzed;

a packet generator for loading the captured packet stored in the captured packet DB, and generating the packet to be transmitted;

a fuzzing rule DB for storing fuzzing rules required to apply malformation for fuzzing to the packet generated by the packet generator; and a fuzzing rule applier for applying a corresponding fuzzing rule stored in the fuzzing rule DB to the packet generated by the packet generator, and outputting a resulting packet, wherein the fuzzing supervisor program provider is installed on a server computer and operated in a form of a local proxy, and wherein the fuzzing performance client program generator is installed on a client computer.

10. The method of claim 9, wherein the fuzzing rules stored in the fuzzing rule DB include rule application conditions required to determine whether to apply a rule to malformation of data for fuzzing, and application rules enabling any data to be inserted into a specific field of the generated packet or to be deleted from the specific field, or enabling data in the specific field to be malformed, for individual fields of a network protocol.

11. The method of claim 10, wherein each of the rule application conditions includes one or more of a packet sequence and a packet data pattern.

12. The method of claim 9, wherein applying the fuzzing rule to the packet to be transmitted and outputting the resulting packet comprises applying or not applying the fuzzing rule to the packet to be transmitted depending on whether an application condition to be applied to the packet is present.

13. The method of claim 12, wherein applying the fuzzing rule to the packet to be transmitted and outputting the resulting packet comprises, if the fuzzing rule is applied, malforming and outputting single-bit or multi-bit data of the packet to be transmitted before the corresponding packet is output.

14. The method of claim 12, wherein applying the fuzzing rule to the packet to be transmitted and outputting the resulting packet comprises, if the fuzzing rule is not applied, outputting the packet to be transmitted without modifying the packet.

* * * * *